G. HAVELL,

Assignor, by mesne assignments, to ROBERTS & HAVELL.

Traveling-Bag Frames.

No. 8,529. Reissued Jan. 7, 1879.

Witnesses:

Geo. W. Miatt

Edwd Payson

Inventor:

George Havell,

Per Edw. E. Quimby

Atty.

N. PETERS, PHOTO-LITHOGRAPHER, WASHINGTON, D. C.

UNITED STATES PATENT OFFICE.

GEORGE HAVELL, OF NEWARK, NEW JERSEY, ASSIGNOR, BY MESNE ASSIGNMENTS, TO ROBERTS & HAVELL, OF SAME PLACE.

IMPROVEMENT IN TRAVELING-BAG FRAMES.

Specification forming part of Letters Patent No. 61,423, dated January 22, 1867; Reissue No. 8,529, dated January 7, 1879; application filed November 14, 1878.

*To all whom it may concern:*

Be it known that I, GEORGE HAVELL, of Newark, New Jersey, have invented a certain Improvement in Bag-Frames, of which the following is a specification:

My improvement relates to that class of bag-frames in which the side pieces are made of longitudinally-corrugated strips of sheet metal, as shown and described in Letters Patent of the United States No. 55,290, granted to me June 5, 1866, for an improvement in frames for bags and similar objects; and my invention consists in adapting the mode of construction described in my aforesaid patent to bag-frames composed of two side pieces pivoted together.

In my present invention each of the two pieces of which the frame is composed is so folded or doubled as to present a longitudinal groove for receiving the edge of the cloth, leather, or other material of which the outside of the bag is made. The parallel folds of the strips of metal form the side walls of the groove, and the bight of the folded strip is bent to a right angle, and thus forms a laterally-projecting flange, which imparts to the strip an L-shaped cross-section. The side pieces are bent to conform to the shape of the bag, one being made slightly smaller than the other, so that it will be overlapped by the laterally-projecting flange of the other strip. The overlapping flange thus becomes a cap-plate or shield, covering the joint made by the two side pieces of the frame when closed, and thus preventing the escape of thin objects from the bag.

Figure 1:
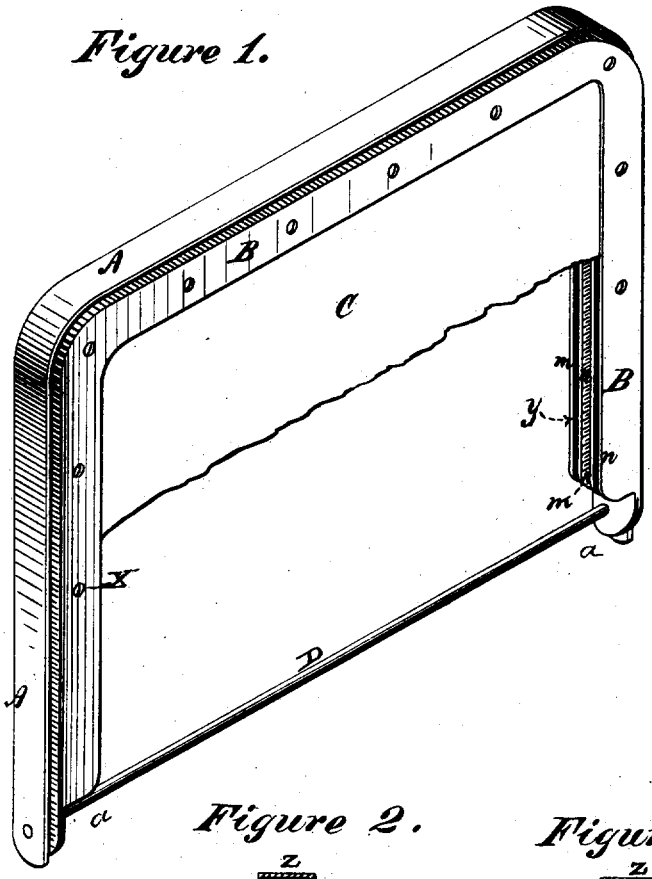
Figure 2:
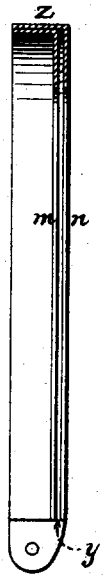

The accompanying drawings, representing a bag-frame embodying my invention, are as follows:

Figure 1 is an isometrical perspective of the frame, showing a portion of the leather or cloth of which the bag is composed attached to one of the side pieces. Fig. 2 is a transverse section of one of the side pieces of the frame; and Fig. 3 is a transverse section of the folded strip of sheet metal of which the side pieces are composed.

Figure 3:
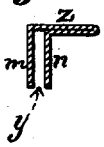

The structure represented in the drawings consists of a bag-frame composed of the two side pieces A and B, each of which is made of a strip of sheet metal which has been so folded or doubled as to acquire the shape, in cross-section, which is shown in Fig. 3. The strip of metal thus folded is first made straight and afterward bent to conform to the shape of the bag.

In constructing the side pieces, I take a strip of sheet metal of suitable width, and, by means of the usual rolling machinery, or in any other way, first fold it so that its cross-section partakes somewhat of the shape of the letter T, the cross-bar of the T upon one side of the stem being as much longer than the opposite part of the cross-bar as the width of the groove *y*, which is subsequently formed by folding down the longer end of the cross-bar of the T into a position parallel with the stem, but slightly distant therefrom. The two parallel folds *m n* constitute the side walls of the groove *y*, in which is inserted the edge of the sheet C of leather or other material of which the outside of the bag is made. Each side piece of the frame is so applied that its lateral flange Z projects toward the other side piece. The end portions of the folds *m n* of the side-pieces are cut away, leaving the ends of the flange Z to form the hinge-plates *a a*, which are perforated to receive the pivot or connecting rod D, by which the side pieces are connected together. The flange Z of the side piece A overlaps the joint made by the two side pieces when closed, and serves as a cap-plate or shield for preventing the escape of thin objects from the bag.

By constructing each of the two pieces of the frame of one piece of sheet metal, provided with the groove *y*, I am enabled to dispense with the ring heretofore riveted to the side piece for the purpose of securing thereto the leather or other material of which the bag is made. When the ring is used, there is a difficulty in getting the rivet-openings in both the ring and the side piece to correspond with each other. In my invention the rivet-holes are made through the two rigidly-connected folds *m n* of the side pieces, and the edges of the cloth, leather, or other material of which the outside of the bag is made, being inserted in the grooves *y*, are therein held by means of the rivets X.

I claim as my invention in a bag-frame—

1. A folded sheet-metal side piece provided with a longitudinal groove, in combination with the leather, cloth, or other material of which the outside of the bag is made, and provided with rivet-holes for the reception of rivets, by means of which the leather, cloth, or other material of which the bag is made is secured between the folds of the side piece, substantially as described.

2. A side piece in a bag-frame suitably secured to the leather or other material composing one of the outer sides of the bag, and provided with the lateral flange Z, adapted to overlap and shield the joint made by the side pieces of the frame when the bag is closed, for the purpose of preventing the escape of thin objects from the bag.

3. The sheet-metal side piece A, provided with the wings *m* and *n* for enfolding the edge of the leather or other material composing one of the outer sides of the bag, and provided with the inwardly-projecting flange Z, in combination with the side piece B, substantially as and for the purposes set forth.

GEORGE HAVELL.

Witnesses:

H. A. KINGSLEY,

JOHN OTTO.